(12) United States Patent
Wager et al.

(10) Patent No.: US 9,446,663 B2
(45) Date of Patent: Sep. 20, 2016

(54) METHODS AND APPARATUS FOR INDEPENDENTLY VARIABLE TORQUE DISTRIBUTION TO MOTOR VEHICLE DRIVE WHEELS

(71) Applicant: Gebhard Charles Wager, Kelowna (CA)

(72) Inventors: Gebhard Charles Wager, Kelowna (CA); David Philip Desjardins, Kelowna (CA)

( * ) Notice: Subject to any disclaimer, the term of this patent is extended or adjusted under 35 U.S.C. 154(b) by 0 days.

(21) Appl. No.: 14/406,519

(22) PCT Filed: Jun. 10, 2013

(86) PCT No.: PCT/CA2013/000573
§ 371 (c)(1),
(2) Date: Dec. 8, 2014

(87) PCT Pub. No.: WO2013/181751
PCT Pub. Date: Dec. 12, 2013

(65) Prior Publication Data
US 2015/0129347 A1 May 14, 2015

Related U.S. Application Data

(60) Provisional application No. 61/657,665, filed on Jun. 8, 2012.

(51) Int. Cl.
| | |
|---|---|
| *B60K 17/35* | (2006.01) |
| *B60K 17/02* | (2006.01) |
| *B60K 23/04* | (2006.01) |
| *F16D 13/56* | (2006.01) |
| *F16D 25/0638* | (2006.01) |
| *F16D 48/02* | (2006.01) |
| *B60K 17/34* | (2006.01) |
| *F16D 13/54* | (2006.01) |
| *F16D 21/02* | (2006.01) |

(52) U.S. Cl.
CPC .......... *B60K 17/3515* (2013.01); *B60K 17/02* (2013.01); *B60K 17/34* (2013.01); *B60K 23/04* (2013.01); *F16D 13/54* (2013.01); *F16D 13/56* (2013.01); *F16D 21/02* (2013.01); *F16D 25/0638* (2013.01); *F16D 48/02* (2013.01); *B60K 2023/043* (2013.01)

(58) Field of Classification Search
CPC .... B60K 23/08; B60K 23/04; B60K 17/346; B60K 17/02; B60K 17/34; B60K 17/358; B60K 2023/043; F16D 13/56; F16D 48/02
See application file for complete search history.

(56) References Cited

U.S. PATENT DOCUMENTS 5,211,257 A * 5/1993 Shuzo ................ B60K 17/3462
192/58.92
5,584,776 A * 12/1996 Weilant ............. B60K 17/3505
180/233

(Continued)

*Primary Examiner* — Faye M Fleming
(74) *Attorney, Agent, or Firm* — Anthony C. Edwards

(57) ABSTRACT

A wheel clutch includes a clutch pack mounted in a housing wherein either the friction plates or clutch plates of the clutch pack are fixed for rotation with a corresponding drive wheel, and the other of the friction plates or clutch plates is fixed for rotation with a drive shaft of the vehicle, a resilient member within the clutch housing normally biasing the clutch pack into a fully locked mode, a selectively actuable actuator within the clutch housing engaging the resilient member to selectively and progressively reduce a resilient force or to selectively and progressively allow the increase of the resilient force applied by the resilient member to the clutch pack, whereby the clutch pack is completely or progressively unlocked or locked respectively to provide an optimized amount of rotational traction versus rotational slippage.

18 Claims, 8 Drawing Sheets

(56) References Cited

U.S. PATENT DOCUMENTS

| | | | | |
|---|---|---|---|---|
| 5,620,072 A * | 4/1997 | Engle | ............. | B60K 17/342 180/247 |
| 6,817,434 B1 * | 11/2004 | Sweet | ............. | B60K 23/0808 180/197 |
| 7,111,702 B2 * | 9/2006 | Perlick | ............. | B60K 23/08 180/233 |
| 2014/0251083 A1 * | 9/2014 | Suzuki | ............. | B60K 17/344 74/665 F |

* cited by examiner

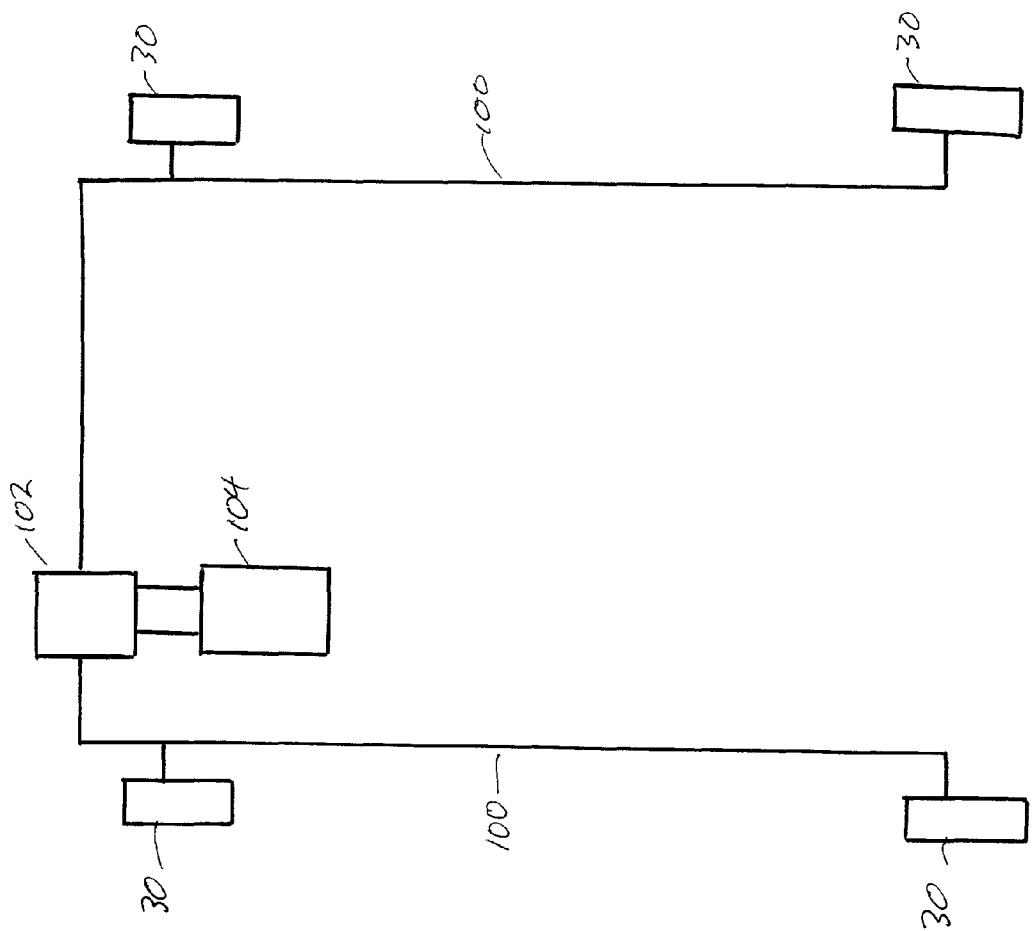

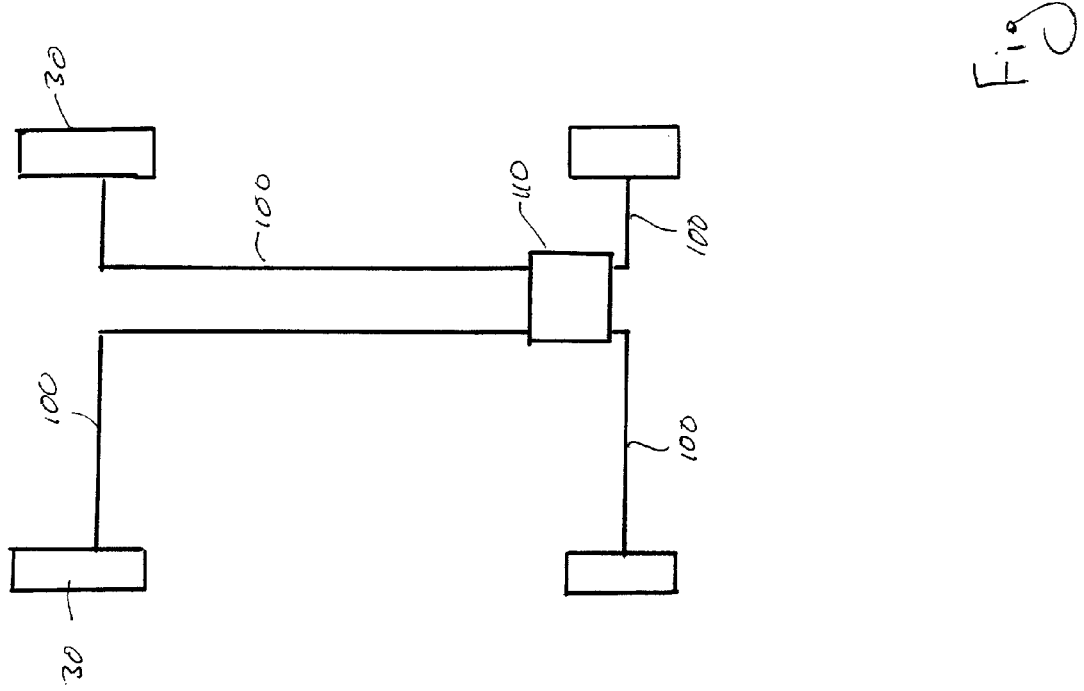

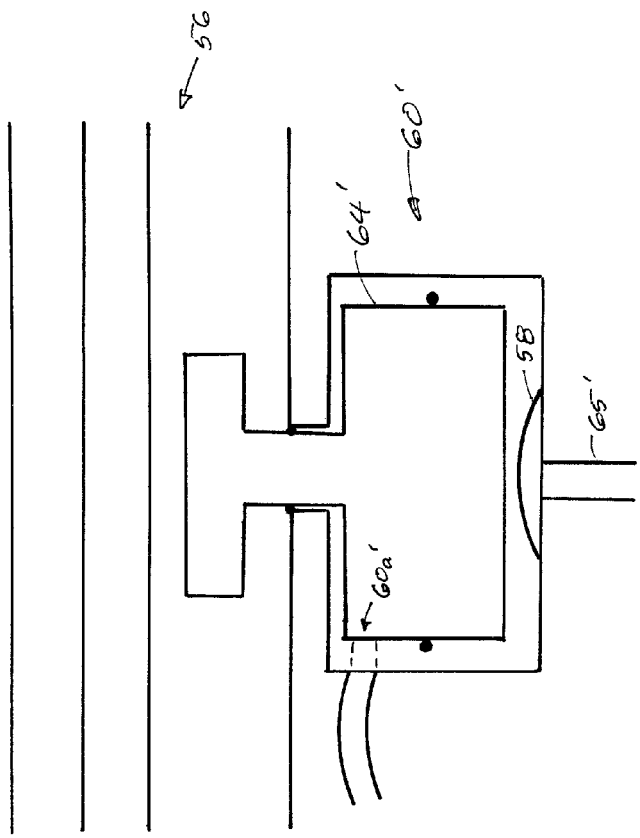

METHODS AND APPARATUS FOR INDEPENDENTLY VARIABLE TORQUE DISTRIBUTION TO MOTOR VEHICLE DRIVE WHEELS

TECHNICAL FIELD

The invention relates to methods and apparatus for driving motor vehicle wheels, and more particularly to a method and apparatus for independently and variably reducing or optimizing torque distribution to motor vehicle drive wheels.

BACKGROUND

Motor vehicles typically use a mechanical differential to distribute engine torque between paired left and right drive wheels. A differential allows paired left and right drive wheels driven by the same input to rotate at different speeds. As compared with a solid axle, this provides superior handling during cornering by allowing the inside drive wheel to turn more slowly than the outside drive wheel. A conventional rear differential is located underneath a car in the middle between the back tires. A differential is a group of gears that revolve around each other and let the two tires, the laterally paired left and right tires, travel at different speeds. A differential is really important for vehicle handling when going around corners, because the tire on the inside of the turn is going in a smaller circle than the outside and therefore is going slower. Without a differential one tire would be dragging, and the car would be difficult to turn and would want to keep going straight. The drawback of a differential is that it causes the vehicle to have less traction because it lets one tire spin without the other and allows the drive force to automatically go to the drive wheel with the least traction.

The reason we need differentials has not changed, but modern higher performing vehicles sometimes need more traction, so in the prior art traction adding devices have been added to try to compensate for the differential.

Some vehicles use limited slip differentials that limit the amount of torque supplied to an idly rotating drive wheel, such as may occur when wheel traction is lost. In vehicles with limited slip differentials, the drive torque applied to the inner drive wheel produces a moment counteracting the moment which tends to turn the motor vehicle. As a result, turning performance with a limited slip differential is lowered as compared with an open differential.

In some circumstances, such as may occur in off-road driving, it is desirable that left and right drive wheels turn in unison regardless of the traction (or lack thereof) available to either wheel individually. Some vehicles provide locked or selectively lockable differentials, which fix, permanently or selectively, the relative rotational orientations of paired left and right drive wheels.

Since open, limited-slip and locked differentials are more or less advantageous depending on circumstances, there is a desire for methods and apparatus that distribute engine torque to paired left and right drive wheels according to selectable and/or automatically adjustable modes. There is further a desire for methods and apparatus that permit the torque at which left and right drive wheels slip relative to one another to be selectively progressively or infinitely varied.

In the prior art applicants are aware of U.S. Pat. No. 7,111,702 which issued Sep. 26, 2006, to Perlick et al. Perlick describes a system for steering angle control of independent rear clutches. Perlick teaches that the vehicle must have four wheel drive and have a conventional differential as the primary drive, which is taught to be in the front end and to receive two-thirds of the power, with the remaining one third of the power going to the secondary drive, ie, to his system. Perlick also calls for a center differential and brake manipulation. In contra-distinction the apparatus described herein works in front wheel drive, rear wheel drive, four or more wheel drive, and equally well with live or independent axles. The present apparatus, that is, as described herein, does not need a primary drive, or as described by Perlick, a conventional front differential, and in fact does not need a conventional differential at all, but will work equally well in conjunction with one. The apparatus described herein can be a stand alone two wheel drive, primary drive, secondary drive, or four or more wheel drive. Perlick requires a micro-processor, multiple sensors and brake manipulation, wherein the present apparatus may advantageously be controlled by the steering or by a separate actuating circuit such as a separate hydraulic circuit, or may for example, like Perlick, utilize processors and sensors.

Perlick's system is either engaged or disengaged, wherein the present apparatus is progressive from completely engaged to completely disengaged as required. According to Perlick, the primary purpose is to improve cornering in primarily front wheel drive applications and is thus not a traction device per se, whereas the present apparatus works in all applications and provides improved steering and handling performance with the least compromise in traction. Perlick teaches only regulating the back wheels and leaving the front wheels with traction and steering compromises, whereas the present application may regulate all driven wheels.

In the prior art applicants are also aware of U.S. Pat. No. 6,817,434 to Sweet which issued Nov. 16, 2004, for an Active Hydraulically Actuated On-demand Wheel End Assembly. Sweet describes a system which is normally 100% unlocked, there thus being zero traction during the normal 100% unlocked mode of each wheel end assembly.

The present apparatus is the opposite, that is, each clutch is normally 100% locked and thus starts with 100% traction. Sweet requires pressure to increase traction and drive the vehicle, whereas the present apparatus is again opposite. In an embodiment of the present apparatus which employs a hydraulic actuator, as the hydraulic system is pressurized traction is decreased only in order to steer the vehicle. Sweet teaches the reverse; viz, manipulating pressure to increase traction. The presently described system manipulates pressure to increase steering performance, whereas the Sweet system takes a wheel spinning under power and attempts to stop or slow it by applying pressure and increasing clutch friction. Typically this condition would be caused while increased power is called for during driving. The present device is the opposite as it keeps the axles locked while the largest amounts of power and traction are required, and then only releases holding force in the clutch when the vehicle is negotiating a turn. Typically this would take place only during reduced throttle applications, and so the present apparatus works in synergy with the reality of the driving dynamics: traction when power is applied, reduced or zero hold in any one independently controlled wheel clutch when handling is required and power requirements typically are reduced.

In the present apparatus a hydraulic pressure failure results in the full traction, i.e., each affected wheel clutch remains fully locked, thereby providing power and 100% traction to the wheels. In the Sweet design, if there is a pressure failure, transmitted power and traction goes to zero and the vehicle cannot move.

The present apparatus acts like a conventional vehicle when parked, i.e. the vehicle is locked in position even without use of a hand-brake. The Sweet design requires a hand-brake or the like or pressure as the wheels are unlocked when parked in the event that pressure bleeds down. Further, the Sweet design does not work on live axles, whereas the present apparatus does. In the Sweet design the axles are short, limiting wheel travel and ground clearance. In the present design longer axles may be used than currently exist, increasing wheel travel and ground clearance. The Sweet design may not easily be retro fitted to existing cars whereas in the present apparatus the wheel clutches may replace existing hubs, differentials or axles in whole or in part, and may be added to the outside of the wheel brakes as a form of locking/unlocking hub.

As with the Perlick design, the Sweet design requires complex sensors, computers or other processors (computers, processors, programmable logic controllers, etc collectively referred to as processors herein) and requires brake control first, then rear traction control followed by front traction control. The present apparatus may in one embodiment be simply controlled by the steering, advantageously with a manual over-ride to help the wheel clutches in the locked position. Unlike in the present apparatus, Sweet makes no mention of unlocking inside tires in a corner, whereas, as described herein, the present apparatus automatically unlocks the inside tires, dramatically improving performance in all conditions.

The foregoing examples of the related art and limitations related thereto are intended to be illustrative and not exclusive. Other limitations of the related art will be apparent to those of skill in the art upon a reading of the specification and a study of the drawings.

SUMMARY OF ASPECTS OF THE INVENTION

The design described herein is simple, lighter, and may be less costly and easier to produce than conventional systems, has low maintenance requirements and provides an optimized performance system for vehicles (ie., cars, trucks, all terrain vehicles, etc and other wheeled devices having at least one driven wheel, collectively referred to herein as a vehicle) when cornering while also providing the most traction the vehicle tires can use.

This may thus result in a vehicle which will be cheaper to buy, easier to drive and park, get better gas mileage, have cheaper maintenance costs and have better traction when required, making it potentially safer. The present system eliminates the need for a conventional differential and all conventional traction adding devices, including limited slip differentials, locking differentials and locking/unlocking hubs. The present system consists of clutches on the drive axles, also referred to herein as wheel clutches, for use on two wheel drive, front or rear, four wheel drive, or all wheel drive. The wheel clutches are normally in a locked state or mode, by default. They provide 100% torque/drive force to all driven wheels all the time, until the vehicle needs to turn. Upon turning, in one embodiment which is not intended to be limiting, the vehicle's steering system releases pressure to the wheel clutches as required to improve handling or cornering ability of the vehicle. The present system thus only reduces the torque/traction required by the minimum amount required by any given wheel to attain the required handling performance for that particular driving application, always automatically maintaining the optimized or highest combined level of handling and torque/traction.

In one embodiment, when the vehicle is turning, the steering system variably or progressively reduces torque on the inside driven tires, thereby reducing steering effort, increasing performance, handling and fuel economy, and reducing body roll, tire and steering wear. The present system automatically and variably or progressively returns to a mechanically locked state when the corner is complete, automatically returning to maximum torque/traction when cornering performance is not required. The present system can be installed on existing wheel hubs, inside existing differential housings, or, in place of conventional wheel hubs, axles and or conventional differentials. It may also replace locking hubs on four wheel drives.

Thus as will be apparent, the present invention works opposite to most traction devices. It starts locked and only unlocks to steer. It is a unique combination of existing components that excels in its simplicity.

To summarize, aspects of the present invention may be characterized as follows: it is a drive system that will work on all vehicles and does not need a conventional differential; it is 100% engaged and only disengaged to steer; unlike all other traction devices for primary differentials, it unlocks the inside tire; it is infinitely adjustable from 0 to 100% engaged; it works on 2, 4, all wheel etc systems; it works on live and independent axles; it can be retro fitted into existing vehicles or built new; it can be used in place of a variety of existing drive line components; it does not require but can use micro processors, wheel speed sensors etc.; it does not require brake manipulation; one configuration allows increased ground clearance and wheel travel over all existing technology when used in independent axles; it also allows for more useable floor space in passenger compartments; it is simple, automatic, inexpensive, lighter; it automatically provides more traction and better steering than all existing conventional systems and can be enhanced with sensors etc.; it would allow the rest of the drive-train to be downsized for mass production because of reduced shock loading on the drive-train; it may save weight and cost and improve vehicle gas mileage.

The system includes a wheel clutch for a drive wheel, and advantageously wheel clutches for two or more drive wheels, or one or more laterally opposite pairs of drive wheels or for example all drive wheels. Each wheel clutch includes a clutch pack mounted in a housing wherein either the friction plates/washers or clutch plates of the clutch pack are fixed for rotation with a corresponding drive wheel, for example for rotation with part or all of the housing, and the other of the friction plates/washers or clutch plates is fixed for rotation with a drive shaft of the vehicle whether or not with an intervening differential or axles or hubs etc. A resilient member is mounted within the clutch housing so as to normally bias the clutch pack into a fully locked mode, that is, so that the clutch pack is compressed to frictionally lock the clutch plates against the friction plates/washers. A selectively actuable actuator operates within the clutch housing to engage the resilient member and to thereby selectively and progressively reduce a resilient force of the resilient member or to selectively and progressively allow the increase of the resilient force applied by the resilient member to the clutch pack, whereby the clutch pack is completely or progressively unlocked or locked respectively to provide an optimized amount of rotational traction versus rotational slippage.

In embodiments described herein and illustrated, the actuator is a hydraulically actuated piston and the resilient member is a spring washer, although these are meant to be examples and not limiting, as one skilled in the art would know that other actuation means and other resilient members would also work, especially at the surprisingly low actuation pressures that have been found to work, as better described below.

BRIEF DESCRIPTION OF THE DRAWINGS

The drawings show non-limiting example embodiments wherein like reference numerals denote corresponding parts in each view.

FIG. 5 is a schematic drawing of a hydraulic control system for controlling a vehicle's wheel clutch assemblies according to a first example embodiment employing the vehicle's power steering pump and steering box.

FIG. 6 is a schematic drawing of a hydraulic control system for controlling a vehicle's wheel clutch assemblies according to a second example embodiment employing a secondary hydraulic system and optionally a processor and sensors.

FIG. 7 is a diagrammatic partially cut-away view of an alternative embodiment of a wheel clutch.

DESCRIPTION

Throughout the following description specific details are set forth in order to provide a more thorough understanding to persons skilled in the art. However, well known elements may not have been shown or described in detail in order to avoid unnecessarily obscuring the disclosure. Accordingly, the description and drawings are to be regarded in an illustrative, rather than a restrictive, sense.

Figure 1:
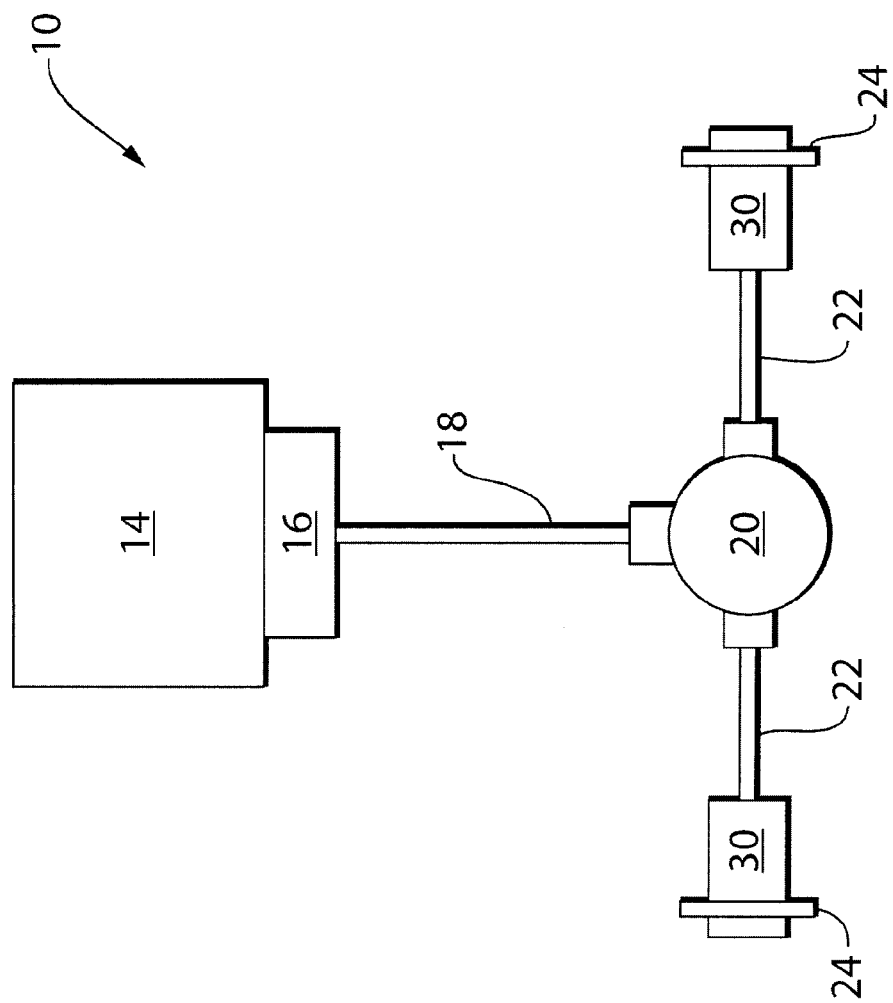
FIG. 1 is a schematic plan view of a part of a vehicle powertrain comprising an axle assembly according to an example embodiment.

FIG. 1 is a schematic plan view of part of a motor vehicle powertrain 10. As shown in FIG. 1, power from an engine 14 is transmitted via a transmission 16 to a driveshaft 18. Torque from driveshaft 18 is distributed by a torque transmitting device 20 to shafts 22. In some embodiments, torque transmitting device 20 rotates to drive shafts 22 at the same rotational speed. For example, torque transmitting device 20 may comprise a spool, a locking differential, or the like. Shafts 22 are each coupled to a wheel hub 24 by an axle assembly 30. Importantly, a differential in the conventional sense described above in the background section of this specification, that is, which allows different rotational speeds of corresponding left and right wheels during a turn by conventional means is not required in embodiments employing the present invention.

Figure 2:
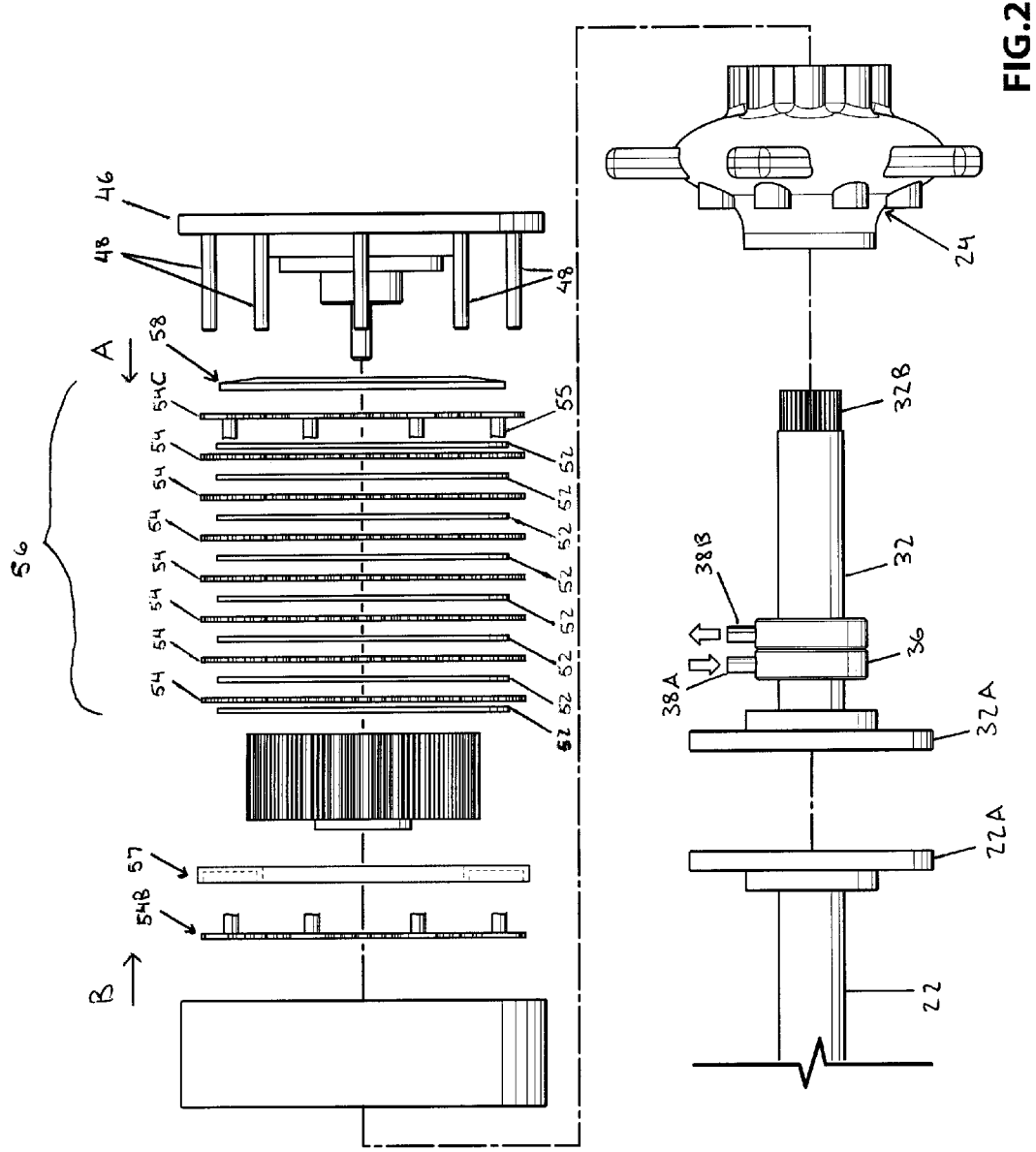
FIG. 2 is a side elevation view of an axle assembly according to an example embodiment.
Figure 3:
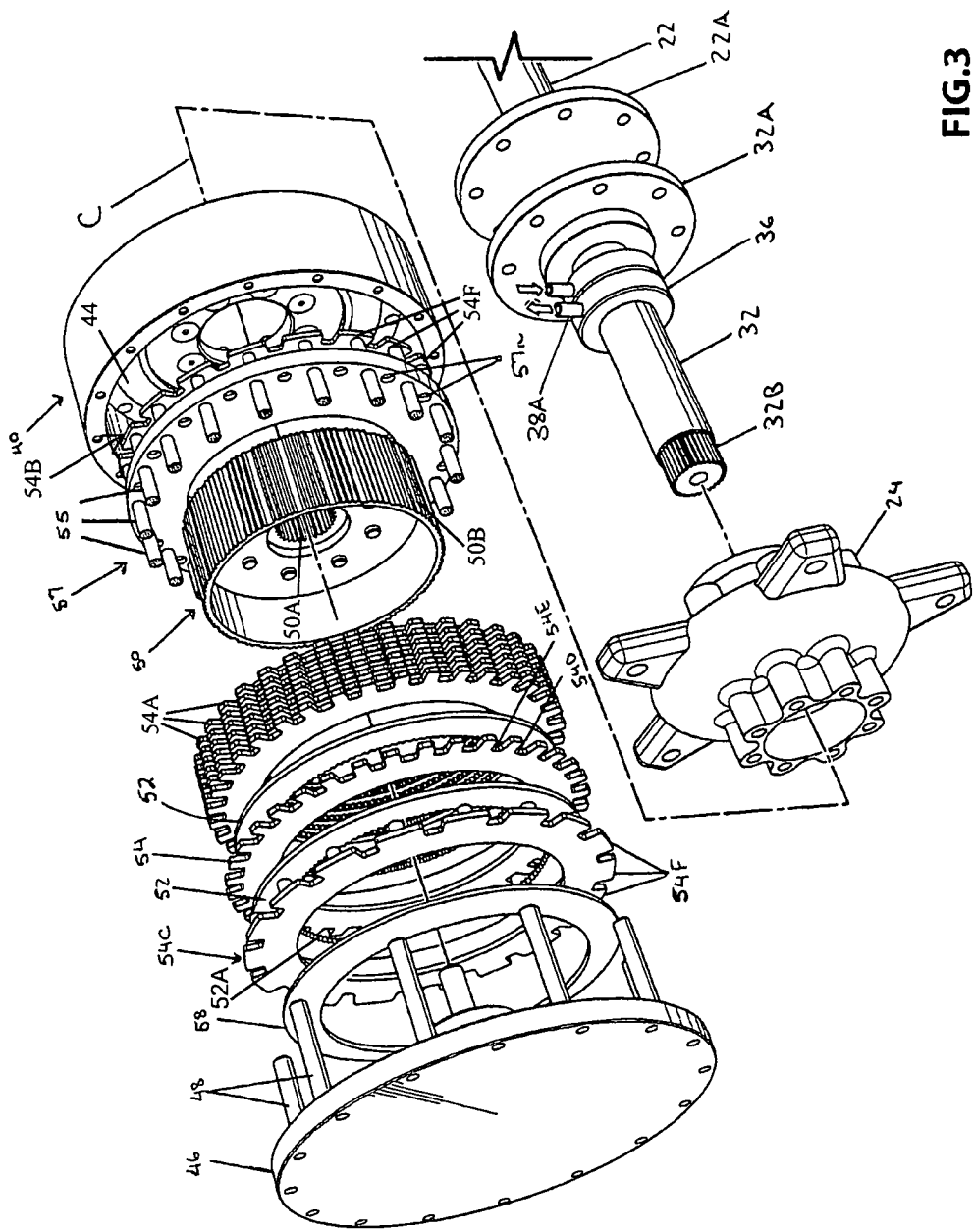
FIG. 3 is an exploded perspective view of the axle assembly shown in FIG. 2
Figure 4:
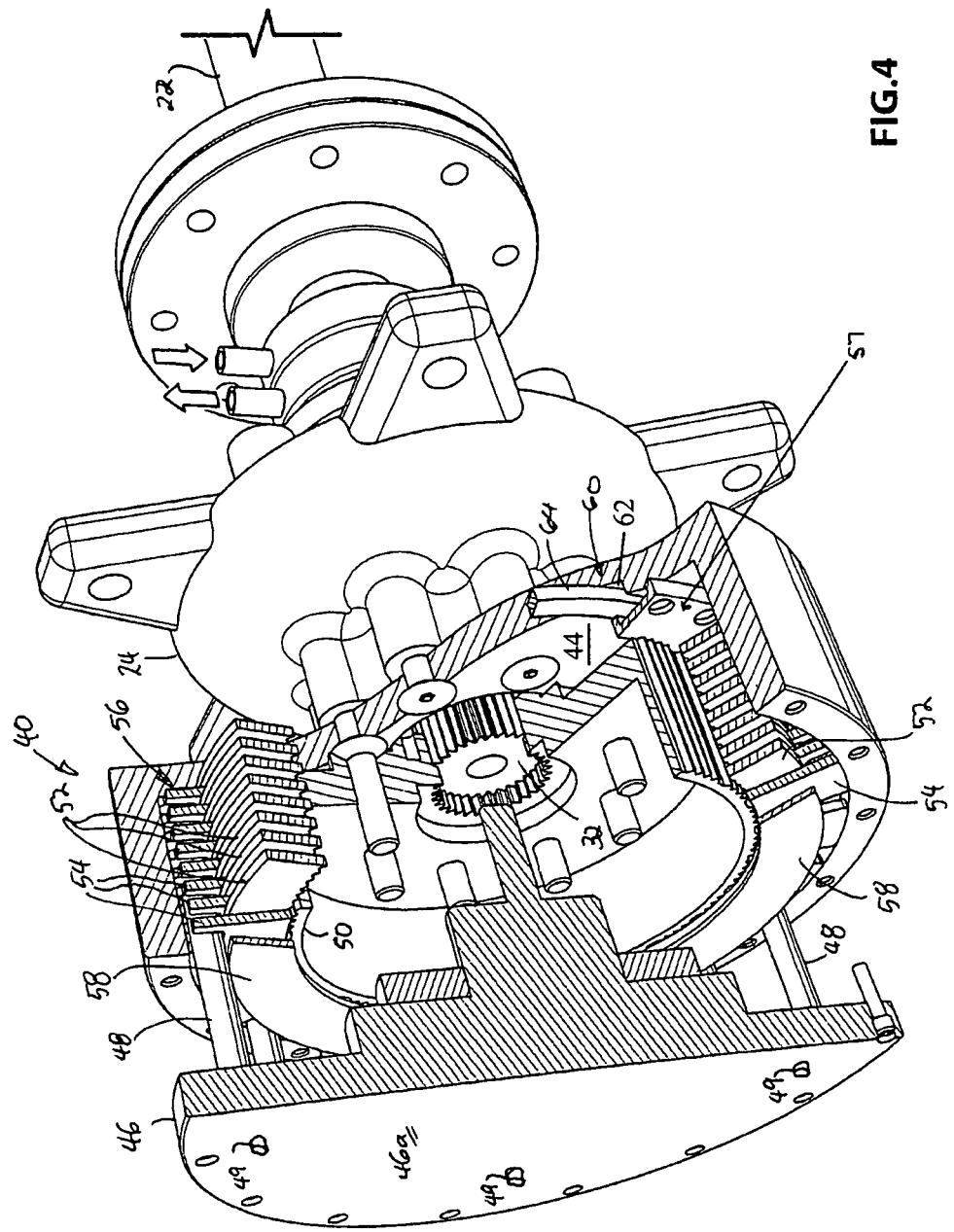
FIG. 4 is a partially-exploded perspective view of the axle assembly shown in FIG. 2.

FIGS. 2, 3 and 4 show, respectively, an exploded side elevation view, an exploded perspective view, and a partially-exploded perspective view of an axle assembly 30 according to an example embodiment. Axle assembly 30 transmits torque from shaft 22 to wheel hub 24. Assembly 30 comprises a spindle 32 having an integrally formed mounting portion, namely flange 32A, that is removably mounted to a flange 22A formed at the outward end of shaft 22. A rotating seal 36 is mounted on spindle 32 adjacent flange 32A. Rotating seal 36 provides for the transmission of hydraulic fluid from an input port 38A to an output port 38B that may rotate relative to one another about spindle 32. Wheel hub 24 is mounted outwardly adjacent of rotating seal 36 for rotation about spindle 32.

A clutch drum 40 is mounted laterally outward of wheel hub 24 for rotation about spindle 32. Clutch drum 40 comprises a hollow cylinder 42 closed at one end by an integrally formed base 44 and at its other end by a removable plate 46. A plurality of bolts 41 extend through base 44 and into wheel hub 24 to fixedly connect clutch drum 40 to wheel hub 24, such that they rotate in unison about spindle 32. A spool 50 is mounted for rotation with spindle 32 inside clutch drum 40. More particularly, grooves or internal splines formed on a central aperture 50A formed in spool 50 mate with external splines formed at end 32B of spindle 32.

A plurality of friction discs, washers or plates 52 interleaved with clutch plates 54 provide for variable transmission of rotation between spool 50 and clutch drum 40. For convenience, the interleaved stack of friction discs 52 and clutch plates 54 may be referred to herein as a clutch pack 56. Clutch pack 56 is housed within clutch drum 40. Friction discs 52 are mounted to rotate in unison with spool 50 around spindle 32. More particularly, teeth 52A formed along central apertures defined through friction discs 52 mate with external splines 50B formed on the outer sidewall of spool 50. Clutch plates 54 are mounted to rotate in unison with clutch drum 40 about spindle 32. More particularly, teeth 54A formed on the outside edges of clutch plates 54 mate with a plurality of radially-arrayed posts 48 that project inwardly into clutch drum 40 from plate 46. The free ends of posts 48 are received in a corresponding radial array of recesses 44A formed in base 44 of clutch drum 40. In some embodiments, plate 46 is sealed against clutch drum 40, and clutch drum 40 may be filled with fluid.

A spring washer 58 compresses friction discs 52 and clutch plates 54 in direction A towards base 44 of drum 40. Spring washer 58 may have a waffle or corrugated structure, or a dished structure, or a slightly conical structure, or other means for providing resiliency for the washer so as to resiliently urge the compression of clutch pack 56 into drum 40 in direction A. Thus, clutch pack 56 is normally biased into a fully engaged mode, locking rotation of spindle 32 to rotation of plate 46. That is, compression of clutch pack 56 by the resilient urging of spring washer 58 increases frictional engagement between adjacent friction discs 52 and clutch plates 54, which provides a connection between clutch drum 40 and spool 50.

Bolts 49 are mounted to the laterally outer surface 46a of cap plate 46. Bolts 49 allow mechanically pre-loading the spring washer 58.

In the illustrated embodiment, a hydraulic actuator 60 is provided on base 44. Actuator 60 comprises an annular barrel 62 defined in base 44 and an annular piston 64 sealingly disposed in and movable along barrel 62. The axis of barrel 62 is parallel to the longitudinal axis of spindle 32, and in the illustrated embodiment is co-axial with the longitudinal axis of spindle 32. Piston 64 is controllably movable outward along barrel 62 by increasing the supply of hydraulic fluid to a chamber 66 defined between barrel 62 and piston 64. Hydraulic fluid is supplied to chamber 66 by way of a fluid line (fluid line 67 in FIG. 7, but not shown in the other drawings) connected between output port 38A of rotating seal 36 and a port located on clutch drum 40.

In a preferred embodiment the hydraulic fluid is hydraulic steering fluid from the hydraulic steering pump and hydraulic steering circuit of the vehicle. Thus as the vehicle's steering wheel is turned, the gradually increasing pressure of the hydraulic steering fluid variably or progressively actuates actuator 60, thereby correspondingly allowing limited slippage in the clutch pack 56. This allows for increasingly differential rates of rotation of the inner versus the outer wheels of the pair of left and right driven wheels.

The actuation of the actuator 60 in direction B compresses spring washer 58 in a direction opposite to direction A. This unlocks clutch pack 56, thereby allowing at least limited rotary slippage between friction discs 52 and clutch plates 54.

The force from actuation of actuator 60 is imparted to spring washer 58 by the use of a pair of book-end clutch plates or caging washers 54B and 54C which in conjunction with pins 55 form an open, cylindrical frame acting between piston 64 and spring washer 58 when actuator 60 is urging spring washer 58 so as to de-compress clutch pack 56.

Teeth 54A on clutch plates 54 form an array of radially spaced apart gaps 54D and 54E therebetween, radially equally spaced apart around longitudinal axis of rotation C. Gaps 54D and 54E alternate around the perimeter of each clutch plate 54. Gaps 54D and 54E may be identical to one another. Clutch plates 54 are aligned relative to one another so that all of the gaps 54D line up and all of the gaps 54E line up, so that gaps 54D and 54E each form corresponding longitudinal channels running longitudinally the length of clutch pack 56 in an array of radially spaced apart longitudinal channels. Posts 48 extend through and along some or all of the channels formed by gaps 54E, and pins 55 extend through and along some or all of the channels formed by gaps 54D. Book-end clutch plates or caging washers 54B and 54C do not have gaps 54D. Instead, they have rigid flanges (or widened teeth) 54F where gaps 54D would be. Consequently, pins 55 bear against flanges 54F. That is, each pin 55 is sandwiched, length-wise, between corresponding pairs of flanges 54F on each plate or washer 54B. Posts 48 are longer than pins 55. Posts 48 extend all of the way from plate 46 to base 44 in drum 40. Pins 55 only extend between book-end clutch plates or caging washers 54B and 54C.

Figure 4A:
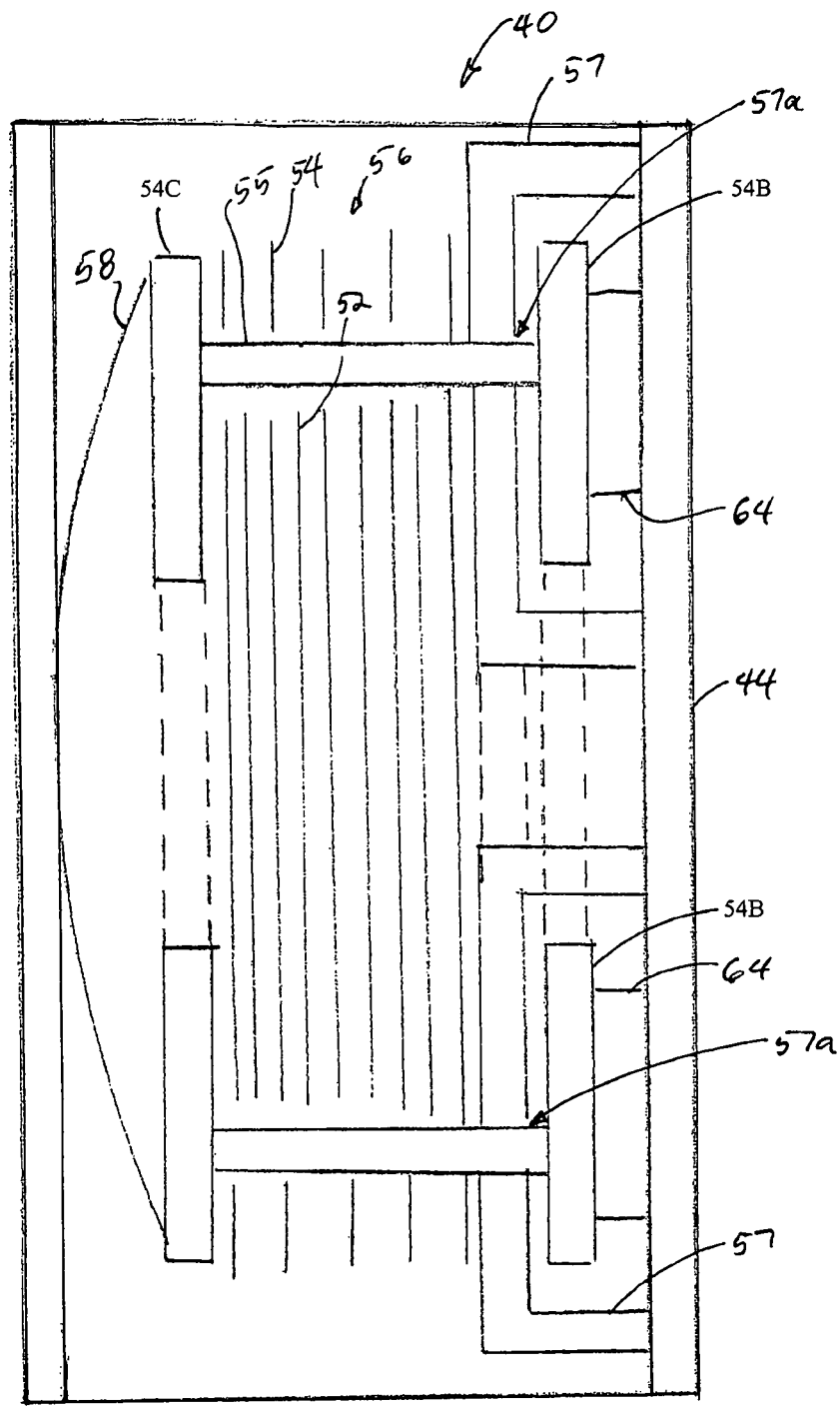
FIG. 4a is a diagrammatic sectional view of an alternative embodiment of a wheel clutch.

The open, cylindrical frame formed by pins 55 sandwiched on-end between the pair of book-end clutch plates or caging washers 54B and 54C transmits a load, in compression, against spring washer 58 as piston 64 is extended away from base 44, thereby relieving and reducing the compressive load on clutch pack 56. This allows for de-compression of clutch pack 56. As piston 64 retracts the loading is gradually removed from the open frame of pins 55 and the book-end clutch plates or caging washers 54B and 54C allowing spring washer 58 to re-compress clutch pack 56 against thrust plate or shoulder washer 57. Compression of clutch pack 56 is enabled because ends 55a of pins pass through corresponding holes 57a in thrust plate or shoulder washer 57 as piston 64 retracts towards base 44. Decompression of the clutch pack 56, which is otherwise normally clamped between spring washer 58 and shoulder washer 57, is sufficient to allow selectively limited or progressive slippage or unlimited slippage between clutch plates 54 and friction washers 52. As clutch pack 56 is decompressed, the individual clutch plates 54 are free to translate slightly along posts 48 and pins 55, and friction washers 52 are free to translate slightly along the external splines of spool 50 so as to slightly expand clutch pack 56. They translate so as to re-compress within clutch pack 56, and lock the axle assembly 30, as the spring washer 58 is allowed to re-engage against the clutch pack 56, pressing clutch pack 56 against shoulder washer 57 as the actuator piston 60 is retracted and pins 55 retract through holes 57a. A diagrammatic partially cutaway view of such an arrangement is shown in the sectional view of FIG. 4a.

The torque at which wheel hub 24 will slip relative to the shaft 22 is thus controllable by varying amount of compression exerted by spring washer 58 on clutch pack 56 as regulated by actuation of hydraulic actuator 60. Thus by retracting piston 64 to allow the full compression of clutch pack 56 by spring washer 58, axle assembly 30 may transfer torque from shaft 22 to wheel hub 24 in the mode of a locked differential. Limited extension of piston 64, resulting in limited reduction in the compression of clutch pack 56 by spring washer 58 provides the functionality of a limited slip differential. The functionality of an open differential is achieved by full extension of piston 64 to relieve the compression of clutch pack 56 by spring washer 58. Those skilled in the art will appreciate that in one embodiment, which is not intended to be limiting, clutch drum 40, clutch pack 56, spool 50 and hydraulic actuator 60 comprise the components of a clutch in which spool 50 and friction plates 52 comprise driving members and clutch drum 40 and clutch plates 54 comprise driven members.

In an example prototype embodiment, which again is not intended to be limiting, clutch pack 56 comprises eight ⅛" thick friction discs 52 and nine ⅛" thick clutch plates 54 (including book-end clutch plates or caging washers 54B and 54C), and movement of piston 64 by less than 5 thousandths of an inch is sufficient to change the torque transfer mode of axle assembly 30 from the mode of an open differential (for example when the hydraulic steering circuit is pressurized during turning) to the mode of a locked differential (the normal mode of each clutch). Experiments with this prototype embodiment have shown that hydraulic fluid at a surprisingly low pressure of 200 PSI is sufficient to cause axle assembly 30 to behave in the mode of an un-locked limited slip differential during normal turning conditions. In other embodiments, more or fewer friction discs and clutch plates may be used, friction discs and clutch plates may be of large or smaller diameter, and limited or completely un-locked differential behavior may be obtained driving hydraulic actuator 60 at a correspondingly lower or greater pressure respectively.

Example advantages provided by axle assembly 30 include the following:

The force applied to clutch packs 56 may be varied continuously.

The force applied to one clutch pack 56 may be varied independently of the force applied to the other clutch pack 56.

The force applied to clutch packs 56 can be varied quickly (e.g., on the order of milliseconds in an example prototype embodiment) and remotely (e.g., by steering in embodiments where actuator 60 is actuated by the hydraulic steering circuit, or otherwise from a control mounted in the vehicle passenger compartment).

Axle assembly 30 may provide the functionality of a wheel locking and unlocking device. In particular, assembly 30 has been shown in an example prototype embodiment to reliably maintain wheel hub 24 in its normally locked mode relative to shaft 22. In the context of, for example, off road vehicle driving, the capability provided by assembly 30 to quickly and remotely lock and unlock wheel hub 24 and shaft 22 advantageously permits a vehicle to be normally operated in locked mode and easily fully or variably unlocked as circumstances require.

Axle assembly 30 provides performance characteristics similar to a locked differential while providing reduced risk of breaking power-train components when a sudden traction event occurs. In particular, the force exerted by spring washer 58 on clutch packs 56 may be configured such that the torque required to displace friction discs 52 relative to clutch plates 54 (e.g., the torque at which the static friction limit of clutch pack 56 is exceeded) is marginally less than the torque that would break power-train components. Where axle assembly 30 is so configured, a potentially drive-train-breaking torque will cause clutch plates 54 to slip relative to friction discs 52, which may prevent transmission of the potentially damaging torque to drive-train components.

Axle assembly 30 may be controlled to provide desired steering dynamics. For example, the force applied to the clutch pack 56 coupling the driveshaft to the inside wheel of a turn may be made less than the force applied to the clutch pack 56 coupling the driveshaft to the outside wheel. For another example, the force applied to the clutch pack 56 coupling the driveshaft to the inside wheel of a turn may be made greater than the force applied to the clutch pack 56 coupling the drive shaft to the outside wheel.

Wheel hub 24 is mounted relatively close to flange 22A at the end of shaft 22. As a result, axle assembly 30 increases vehicle track by only a small amount as compared with mounting a wheel on flange 22A.

In embodiments where clutch drum 40, spool 50 and clutch pack 56 are located outward of wheel hub 24, such that a wheel mounted on wheel hub 24 may protect clutch drum 40, spool 50 and clutch pack 56 from radially-inwardly directed forces.

A wheel may be mounted on wheel hub 24 and clutch drum 40, spool 50 and clutch pack 56 installed outward of the interface between the wheel and wheel hub 24, so that maintenance and the like may be performed on clutch drum 40, spool 50, clutch pack 56, actuator 60 and the like without removing the wheel.

The continuously variable and independent control of torque transmission through axle assemblies 30 provides flexibility in control of torque transfer between driveshaft 18 and wheel hubs 24. While the steering angle is within a range about center the force regained to lock clutch packs 56 on both left and right drive wheels is applied by the spring washers 58 in each clutch 30. When the steering angle is moved outside of the center range the actuator's force from actuators 60 on spring washers 58 relieves the locking compression of the clutch pack 56 on the inside (or outside) of the turn indicated by the steering angle to permit the inside wheel to slip relative to its shaft 22 (or to allow the outside shaft to slip relative to the outside wheel).

A sensor may detect the force acting on the suspension, and when the suspension force indicates the vehicle is airborne, actuators 60 may be actuated to unlock clutch packs 56, and the actuator force removed to re-lock the clutch packs 56 after the suspension force indicates that the vehicles is no longer airborne. Advantageously, this manner of control may reduce the risk of breaking powertrain components when the wheels suddenly gain traction upon landing.

Where a component is referred to above, unless otherwise indicated, reference to that component (including a reference to "means") should be interpreted as including as equivalents of that components any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example: Though in the described example embodiments a normally locked spring-biased hydraulically unlocked multiple-plate clutch is used, other types of clutches may be used, including electromagnetically actuated multiple-plate clutches, electromagnetic powder clutches, and the like. In embodiments where an electrically operated clutch is used to, electrical power may be provided to the actuating element of the clutch (functionally to unlock the clutch pack) via a slip ring or the like.

The components of axle assembly 30 may be simplified, re-arranged, integrated and/or connected differently. For example, clutch drum 40 may be adapted to be the drive element, and spool 50 may be the driven element (i.e., clutch drum 40 may comprise the driving member and spool 50 may comprise the driven member of a clutch). For another example, clutch drum 40 and spool 50 may be located inward of wheel hub 24, for example mounted where a conventional differential would be located, even possibly as a retro-fit within an existing differential housing. Clutches 30 may replace the axle shafts in whole or in part. For a further example, clutch drum 40 and wheel hub 24 may comprise a single component (e.g., an integrally formed component). In certain embodiments it may not be required to use the actual hydraulic steering system to actuate actuator 60, as it may be a completely separate system that is mechanically or electrically or hydraulically or otherwise activated by the steering system. Thus it could be done with no sensors, wires or valves etc. For yet another example, clutch drum 40 may be mounted on flange 22A of shaft 22, and rotating seal 36 mounted outward of clutch drum 40. In the embodiment illustrated diagrammatically in FIG. 7, piston 64' in actuator 60' acts directly against spring washer 58 so as to remove the need to use the cylindrical open frame of pins 55 between caging washers 54B and 54C. Instead, piston 64', illustrated to be hydraulically actuated, although this is not intended to be limiting, is mounted between clutch pack 56 and spring washer 58, where spring washer 58 is mounted within the actuator chamber, for example interleaved between the piston and an expansion chamber 65', where hydraulic fluid acts on the opposite side of piston 64', entering through port 60a'.

Components of axle assembly 30 may be integrated with shaft 22. For example, shaft 22 may comprise spindle 32.

The components of axle assembly may have relative dimensions that are different from the hydraulic actuator 60. As seen in the diagrammatic views of FIGS. 5 and 6, hydraulic circuit 100 may be connected to the steering box 102, itself connected to power steering pump 104. Hydraulic circuit 100 provides hydraulic pressure to actuator 60 within each assembly 30. In the embodiment of FIG. 6, steering system 110 may contain a hydraulic pump, and may include a secondary static hydraulic system that can be for example mechanically or electrically or hydraulically actuated (or any combination thereof), and may include a processor cooperating with sensors such as described above. Steering system 110 is connected to assemblies 30 by circuits 100.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for applying independently variable torque to the drive wheels of a vehicle comprising:
   a clutch housing,
   a clutch pack mounted in the housing wherein the clutch pack includes interleaved annular friction and clutch plates, said friction plates fixed for simultaneous rotation about a centroidal axis of rotation independently of fixed simultaneous rotation of said clutch plates,
   wherein one of either said friction plates or said clutch plates are fixed for rotation with at least a part of said clutch housing which rotates with a corresponding drive wheel, and the other of said friction plates or said clutch plates is fixed for rotation with a drive shaft of the vehicle,
   a resilient member within said clutch housing biasing by a resilient force applied by said resilient member, said clutch pack into a fully locked mode, wherein in said fully locked mode said friction plates and said clutch plates are compressed together so as to frictionally inhibit relative rotation between said friction plates and said clutch plates about said axis of rotation,
   a selectively actuable actuator within said clutch housing, selectively actuable so as to engage said resilient member and thereby to selectively relieve and reduce said resilient force applied by said resilient member to said clutch pack,
   and wherein said resilient force is said selectively relieved and reduced to either unlock said clutch pack completely, or progressively relieve said clutch pack by an amount sufficient to allow limited relative rotation about said axis of rotation between said friction plates and said clutch plates to thereby provide a selectively optimized amount of rotational traction versus rotational slippage to maximize steering and handling performance of the vehicle in cornering while minimizing loss of drive traction between the drive shaft and the associated drive wheel.

2. The system of claim 1 wherein the vehicle has a laterally opposed pair of left and right drive wheels, said system further comprising, corresponding to the left and right drive wheels, left and right clutches each comprise of said clutch housing, said clutch pack, said resilient member and said actuator, further comprising an actuating sub-system to selectively actuate said actuator in each said clutch wherein, during cornering, said actuating sub-system actuates said actuator in said left clutch to a different extent compared to actuation of said actuator in said right clutch to thereby provide different rates of relative rotation between corresponding friction and clutch plates between said left and right clutches.

3. The system of claim 2 wherein each said actuator is a hydraulic actuator, and wherein said actuating sub-system includes a hydraulic steering pump of a hydraulic steering circuit of the vehicle.

4. The system of claim 1 wherein said resilient member includes a spring washer.

5. The system of claim 2 wherein said resilient member includes a spring washer.

6. The system of claim 3 wherein said resilient member includes a spring washer.

7. The system of claim 3 wherein said actuating sub-system actuator of said each actuator said relieves and reduces said resilient force acting on said clutch pack in at least one of said left and right clutches in an amount corresponding to a magnitude of a steering input or a rate of turn of the vehicle during cornering.

8. The system of claim 1 wherein said resilient member is an annular spring washer, and further comprising at least one thrust member actuated by said actuator and engaging said spring washer so as to reduce resilient biasing of said spring washer when so actuated, and thereby to reduce resilient force as said actuator is actuated from a retracted position into an extended position from a retracted position.

9. The system of claim 8 wherein said actuator is hydraulic and mounted in a first side of said clutch housing, and wherein said spring washer is mounted in a second, opposite side of said clutch housing so as to dispose said clutch pack therebetween, and wherein said at least one thrust member is substantially parallel to said axis of rotation and translates substantially parallel to said axis of rotation relative to said clutch pack.

10. The system of claim 9 wherein said at least one thrust member includes an array of elongate members in a first radially spaced array around said clutch pack.

11. The system of claim 10 wherein one of either said friction plates or said clutch plates have a greater diameter than the other and have teeth extending radially outwardly in a perimeter thereof so as to form a radially spaced array of channels along said clutch pack, said at least one thrust member journalled in and along said array of channels.

12. A system for applying independently variable torque to drive wheels of a vehicle comprising:
   a clutch housing,
   a clutch pack mounted in the housing wherein the clutch pack includes interleaved annular friction and clutch plates, said friction plates fixed for simultaneous rotation about a centroidal axis of rotation independently of fixed simultaneous rotation of said clutch plates,
   wherein one of either said friction plates or said clutch plates are fixed for rotation with at least a part of said clutch housing which rotates with a corresponding drive wheel, and the other of said friction plates or said clutch plates is fixed for rotation with a drive shaft of the vehicle,
   a resilient member within said clutch housing biasing by a resilient force applied by said resilient member, said clutch pack into a fully locked mode, wherein in said fully locked mode said friction plates and said clutch plates are compressed together so as to frictionally inhibit relative rotation between said friction plates and said clutch plates about said axis of rotation,
   a selectively actuable actuator within said clutch housing, selectively actuable so as to engage said resilient member and thereby to selectively relieve and reduce said resilient force applied by said resilient member to said clutch pack,
   and wherein said resilient force is said selectively relieved and reduced to either unlock said clutch pack completely, or progressively relieve said clutch pack by an amount sufficient to allow limited relative rotation about said axis of rotation between said friction plates and said clutch plates to thereby provide a selectively optimized amount of rotational traction versus rotational slippage to maximize steering and handling performance of the vehicle in cornering while minimizing loss of drive traction between the drive shaft and the associated drive wheel,
   wherein the vehicle has a laterally opposed pair of left and right drive wheels, said system further comprising, corresponding to the left and right drive wheels, left and right clutches each comprise of said clutch housing, said clutch pack, said resilient member and said actuator, further comprising an actuating sub-system to said selectively actuate said actuator in each said clutch wherein, during said cornering, said actuating subsystem said actuates said actuator in said left clutch to a different extent compared to said actuation of said actuator in said right clutch to thereby provide different rates of said relative rotation between corresponding said friction and clutch plates between said left and right clutches, and wherein each said actuator is a hydraulic actuator, and wherein said actuating sub-system includes a hydraulic steering pump of a hydraulic steering circuit of the vehicle.

13. The system of claim 12 wherein said resilient member includes a spring washer.

14. The system of claim 12 wherein said actuating sub-system actuator of said each actuator relieves and reduces said resilient force acting on said clutch pack in at least one of said left and right clutches in an amount corresponding to a magnitude of a steering input or a rate of turn of the vehicle during cornering.

15. The system of claim 12 wherein said resilient member is an annular spring washer, and further comprising at least one thrust member actuated by said actuator and engaging said spring washer so as to reduce resilient biasing of said spring washer when so actuated, and thereby to reduce resilient force as said actuator is actuated from a retracted position into an extended position from a retracted position.

16. The system of claim 15 wherein said actuator is hydraulic and mounted in a first side of said clutch housing, and wherein said spring washer is mounted in a second, opposite side of said clutch housing so as to dispose said clutch pack therebetween, and wherein said at least one thrust member is substantially parallel to said axis of rotation and translates substantially parallel to said axis of rotation relative to said clutch pack.

17. The system of claim 16 wherein said at least one thrust member includes an array of elongate members in a first radially spaced array around said clutch pack.

18. The system of claim 17 wherein one of either said friction plates or said clutch plates have a greater diameter than the other and have teeth extending radially outwardly in a perimeter thereof so as to form a radially spaced array of channels along said clutch pack, said at least one thrust member journalled in and along said array of channels.

* * * * *